(12) United States Patent
Jensen et al.

(10) Patent No.: US 7,900,967 B2
(45) Date of Patent: Mar. 8, 2011

(54) ENGINE FITTING AND METHOD OF ASSEMBLING VEHICLES

(75) Inventors: Francis M. Jensen, Northville, MI (US);
Timothy D. Carr, Burton, MI (US);
Debra Benson, Penfield, NY (US);
Roger M. Brisbane, Spencerport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 189 days.

(21) Appl. No.: 12/211,294

(22) Filed: Sep. 16, 2008

(65) Prior Publication Data

US 2010/0066073 A1    Mar. 18, 2010

(51) Int. Cl.
*F16L 35/00*    (2006.01)

(52) U.S. Cl. .............................................. 285/4; 285/239
(58) Field of Classification Search ............... 285/4, 239
See application file for complete search history.

(56) References Cited

U.S. PATENT DOCUMENTS

| | | | | |
|---|---|---|---|---|
| RE13,485 E | * | 11/1912 | Carlson | 285/4 |
| 3,470,893 A | * | 10/1969 | Nelson | 285/3 |
| 4,453,749 A | * | 6/1984 | McKinnon | 285/4 |
| 4,519,449 A | | 5/1985 | Hoskins et al. | |
| 5,141,255 A | * | 8/1992 | Hanaoka | 285/4 |
| 6,183,022 B1 | | 2/2001 | Guest | |
| 6,520,212 B1 | * | 2/2003 | Blivet | 285/4 |
| 7,082,957 B2 | | 8/2006 | Guest | |
| 7,467,643 B2 | * | 12/2008 | Kaneko | 285/4 |
| 7,717,475 B2 | * | 5/2010 | Savelle et al. | 285/239 |
| 2006/0181080 A1 | | 8/2006 | Guest | |
| 2006/0202478 A1 | | 9/2006 | Guest | |

FOREIGN PATENT DOCUMENTS

| | | |
|---|---|---|
| DE | 3490571 C2 | 1/1986 |
| GB | 2159226 A | 11/1985 |

* cited by examiner

*Primary Examiner* — David E Bochna
(74) *Attorney, Agent, or Firm* — Quinn Law Group, PLLC

(57) ABSTRACT

A dual-purpose engine fitting is provided that may be used both during engine testing and during engine use, for vehicles with vacuum assisted brakes and for those without. The fitting has a body portion configured to fit within an opening in the manifold and defining a passage having opposing first and second ends. The fitting has a seal portion enclosing the first end of the passage. The second end of the passage is open to the manifold when the body portion is fit within the manifold. A thinned wall joins the body portion and the seal portion, establishing a predetermined fracture region at which the seal portion will separate from the body portion when sufficient torque is applied to the seal portion to thereby open the first end of the passage. A method of assembling vehicles is also provided.

6 Claims, 4 Drawing Sheets

ENGINE FITTING AND METHOD OF ASSEMBLING VEHICLES

TECHNICAL FIELD

The invention relates to an engine fitting and to a method of assembling vehicles.

BACKGROUND OF THE INVENTION

An engine manifold creates a vacuum when the engine is operating. On some vehicles having vacuum assisted brakes, the manifold vacuum is connected with the brake system using an engine fitting fitted to the manifold, and a conduit connecting the fitting with the brake system. To prevent contamination of the engine, the fitting is plugged during shipping and prior to assembly of the vehicle. Engine testing may also be necessary prior to connection with the brake system and/or installation on the vehicle. The plug must be sufficient to withstand engine pressures reached during such testing, yet must be removable by a torque or force sufficiently low to meet workplace guidelines.

Solutions provided for this problem to date have included using a two-piece fitting design, with a removable nylon nipple acting as a plug, slipped over the outside of the body of the fitting. It is difficult to retain the nipple on the body of the fitting under pressures encountered during testing. Additionally, the nipple creates excess waste as a throw-away component. Complex fittings having multiple components that can achieve a sealed state and an open state are available, but tend to be expensive due to their complex design.

SUMMARY OF THE INVENTION

A low cost dual-purpose component for an engine having an air intake manifold is provided; namely, a fitting that may be used both during vehicle engine testing and during engine use, for vehicles with vacuum assisted brakes and for those without. Accordingly, a fitting is provided having a body portion configured to fit within an opening in the manifold and defining a passage having opposing first and second ends. The fitting may be one-piece. The fitting has seal portion enclosing the first end of the passage. The second end of the passage is open to the manifold when the body portion is fit within the manifold. A thinned wall joins the body portion and the seal portion, establishing a predetermined fracture region at which the seal portion will separate from the body portion when sufficient torque is applied to the seal portion to thereby open the first end of the passage. The fitting thereby functions as a seal for the manifold opening when the seal portion is joined with the body portion, and functions as a conduit between the manifold and a component or system connected with the fitting, such as a vacuum assist brake system, when the seal portion is separated from the body portion.

A method of assembling vehicles using the fitting described above includes providing a first engine with a first engine manifold having a first opening. The method then includes installing a first fitting in the first opening. Under the method, the engine is tested with the seal portion sealing the opening. After testing, the method includes separating the seal portion from the body portion at the weakened joint by applying the predetermined torque to the seal portion. After separating the seal portion, the method includes connecting the body portion with a brake system on a first vehicle to enable vacuum assist of the brake system via a vacuum within the manifold. Because the fitting withstands normal engine operating pressures without separating or fracturing, the method may also include providing a second engine with a second engine manifold having a second opening, installing a second fitting substantially identical to the first fitting in the second opening, and then testing the second engine with the seal portion of the second fitting sealing the second opening. After testing, the engine is operated on the second vehicle without separating the second seal portion, as the second vehicle does not require vacuum assist to the brake system.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
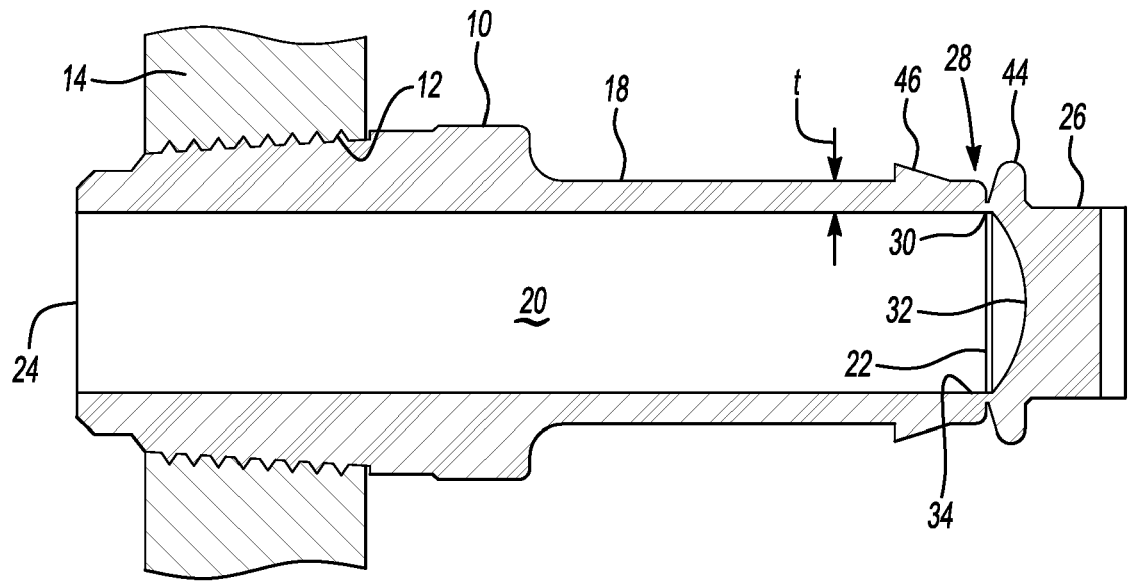
FIG. 1 is a schematic cross-sectional side view illustration of an engine fitting in an opening of an engine manifold shown in fragmentary view, with the engine fitting having a seal portion connected with a body portion via a weakened joint.
Figure 3:
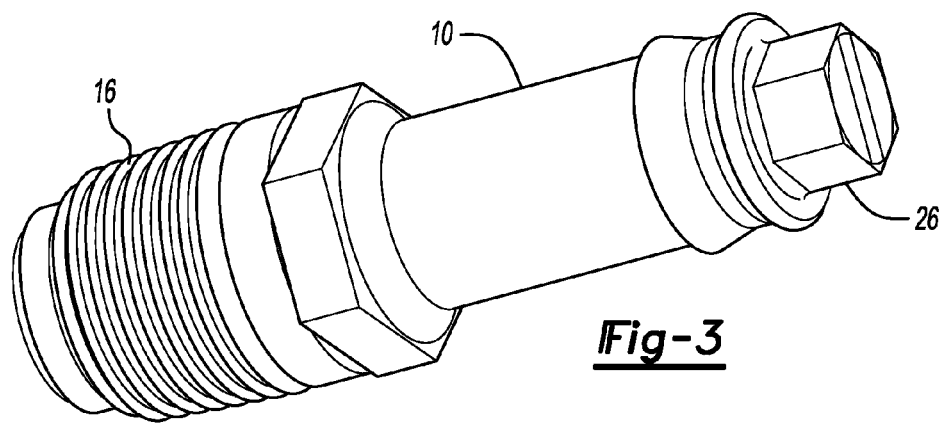
FIG. 3 is a schematic illustration in perspective view of the engine fitting of FIG. 1.

Referring to the drawings, wherein like reference numbers refer to like components, FIG. 1 shows an engine fitting 10, which functions as a dual-purpose component as described herein. The engine fitting 10 is shown at a cross-section taken at lines 1-1 in FIG. 4. The engine fitting 10 is threaded within an opening 12 in an engine air intake manifold 14. Threads 16 on the outer surface of the fitting 10 are apparent in FIG. 3.

The engine fitting 10 is a one-piece, unitary component that is an injection-molded nylon or plastic, such as 33% glass filled nylon, but is not limited to such, and may be any other suitably formed material. The engine fitting 10 has a body portion 18 with an elongated passage 20. The passage 20 has a first end 22 and a second end 24. The fitting 10 also has a seal portion 26, also referred to as a cap or cap portion, that encloses the first end 22. The seal portion 26 is connected or joined with the body portion 18 at a weakened joint 28 formed from of a thinned wall 30. The seal portion 26 has an undercut region 32, also referred to as a recess, that tapers into the seal portion 26 from an outer periphery 34 of the passage 20.

Figure 4:
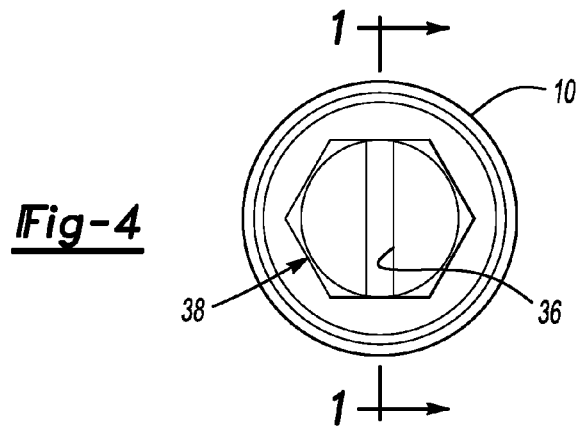
FIG. 4 is a schematic illustration in end view of the engine fitting of FIG. 3.

The weakened joint 28 is purposefully formed to establish a fracture region, enabling fracture to occur at the thinned wall 30 by application of sufficient torque to the cap portion 26, separating the cap portion 26 from the body portion 18. Referring to FIG. 4, torque applied to a screwdriver inserted in slot 36 can cause fracture at the thinned wall 30. Alternatively, torque applied by a box wrench fitted to the side surface 38 of the cap portion 26 can cause fracture. The thinned wall 30 is designed so that the amount of torque applied to the cap portion 26 necessary to cause fracture is within a range determined to be ergonomically acceptable for assembly line operations. For example, the thinned wall 30 may have a thickness that is about 15-20% of the thickness t of the surrounding body portion 18. For example, with a thickness t of 1.9 mm, the thinned wall may have a thickness of 0.4 mm to 0.6 mm in order to allow fracture with an applied torque of 10 to 15 Newton-meters.

Figure 2:
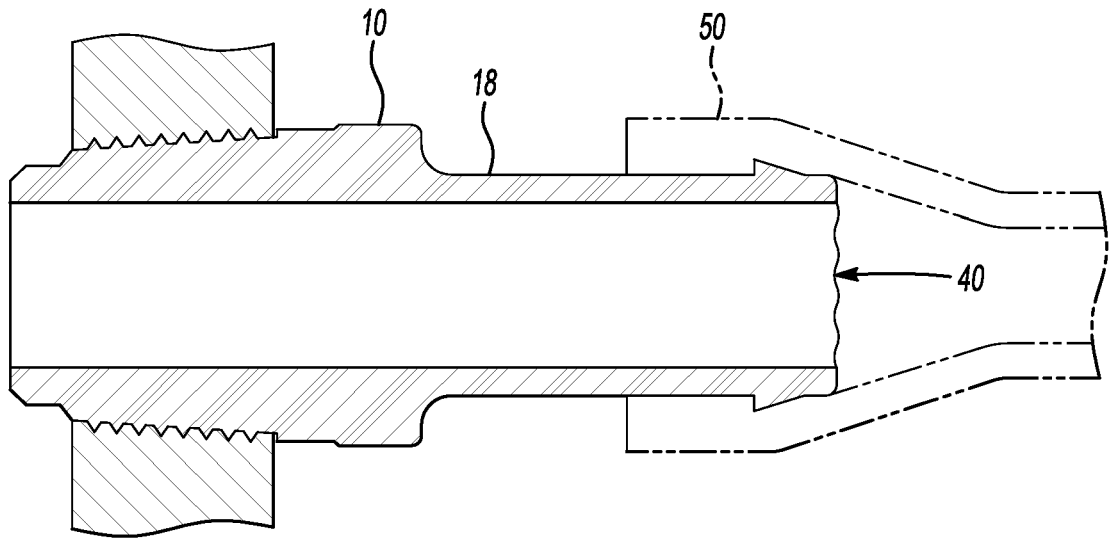
FIG. 2 is a schematic cross-sectional and fragmentary view of the engine fitting of FIG. 1 with the seal portion removed by fracture at the weakened joint, and with a tubular fitting shown in phantom connected to fitting.
Figure 5:
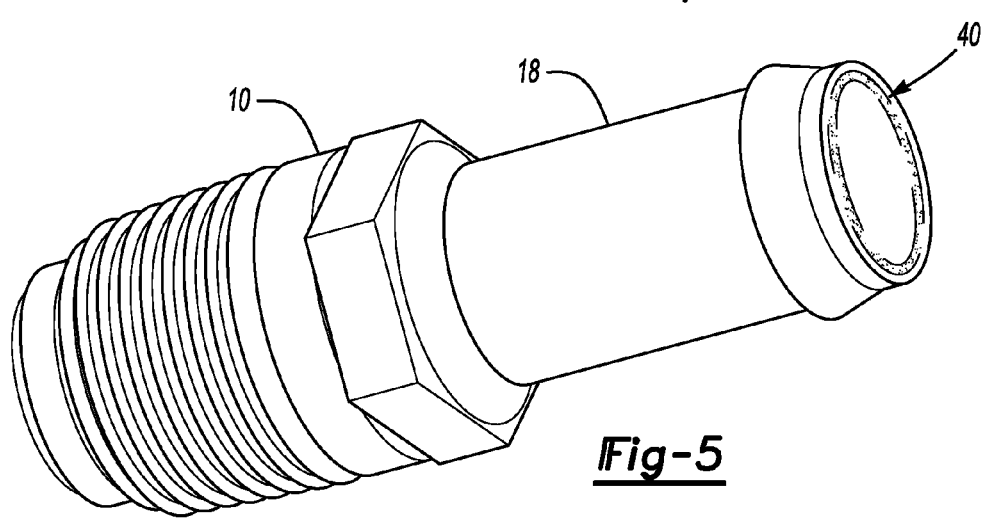
FIG. 5 is a schematic illustration in perspective view of the engine fitting of FIG. 4 with the seal portion removed by fracture at the weakened joint.
Figure 6:
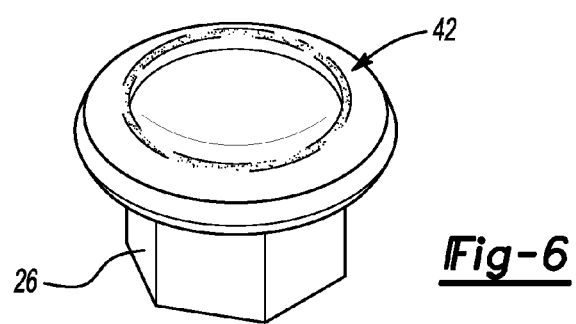
FIG. 6 is a schematic perspective view of the seal portion of the fitting of FIG. 5 after removal by fracture at the weakened joint.

As shown in FIGS. 2 and 5, the fracture surface 40 of the body portion 18 is substantially at the fracture region 28 and thinned wall 30 of FIG. 1, with little or no flash (i.e., jagged edges) extending from the surface 40. A complementary fracture surface 42 of the cap portion 26 is shown in FIG. 6. The undercut region 32 acts to minimize the flash, e.g., to not greater than 0.13 mm, and enables the relatively clean break or fracture by further localizing stress from the applied torque at the weakened joint 28.

Referring to FIG. 1, the cap portion 26 has a peripheral flange 44 that serves as a support surface for a removal tool applied to the cap portion 26. Additionally, the body portion 18 has an annular ridge 46 that serves to help retain a tubular connection 50, shown in phantom in FIG. 2, fit over the first end 22 after removal of the cap portion 26.

Figure 7:
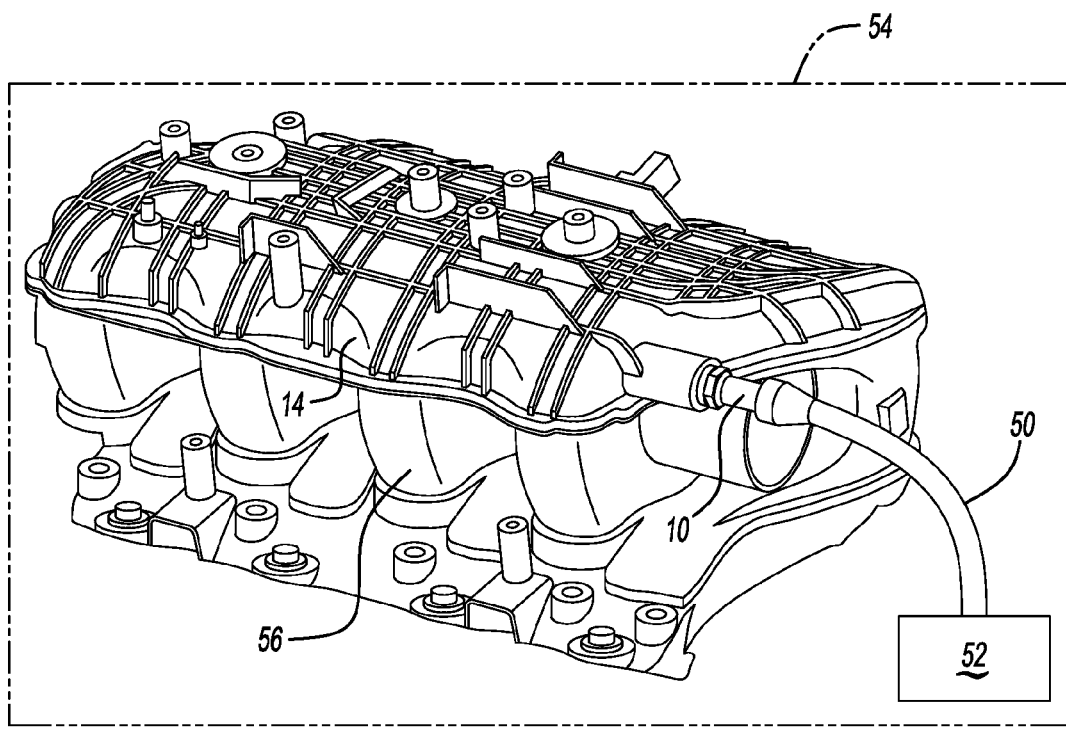
FIG. 7 is a schematic perspective view of an engine on a first vehicle with the engine fitting of FIG. 2 with seal portion removed supported in the engine manifold and connected to a brake system.

As shown in FIG. 7, the tubular connection 50 connects the fitting 10 with a vacuum assist brake system 52 on a vehicle 54. The vacuum developed in the manifold 14 of engine 56 is used as the vacuum source for the vacuum assist brake system 52.

While allowing removal with a minimal torque, the fitting 10 is configured to withstand engine pressures developed during routine engine testing as well as during engine operation over the lifetime of the engine, without causing fracture at the thinned wall 30 or elsewhere. Thus, the thinned wall 30 will not separate during engine testing. Accordingly, the fitting 10 may be installed on engine 56, tested, and then the cap portion 26 may be removed via torque by a worker or robotically, and the hose 50 connected to the fitting 10 and brake system 52. The fitting 10 is thus a dual-purpose fitting, usable as a plug for opening 12 during engine testing, and usable as a conduit between the manifold 14 and the brake system 52 during operation of the vehicle 54.

Figure 8:
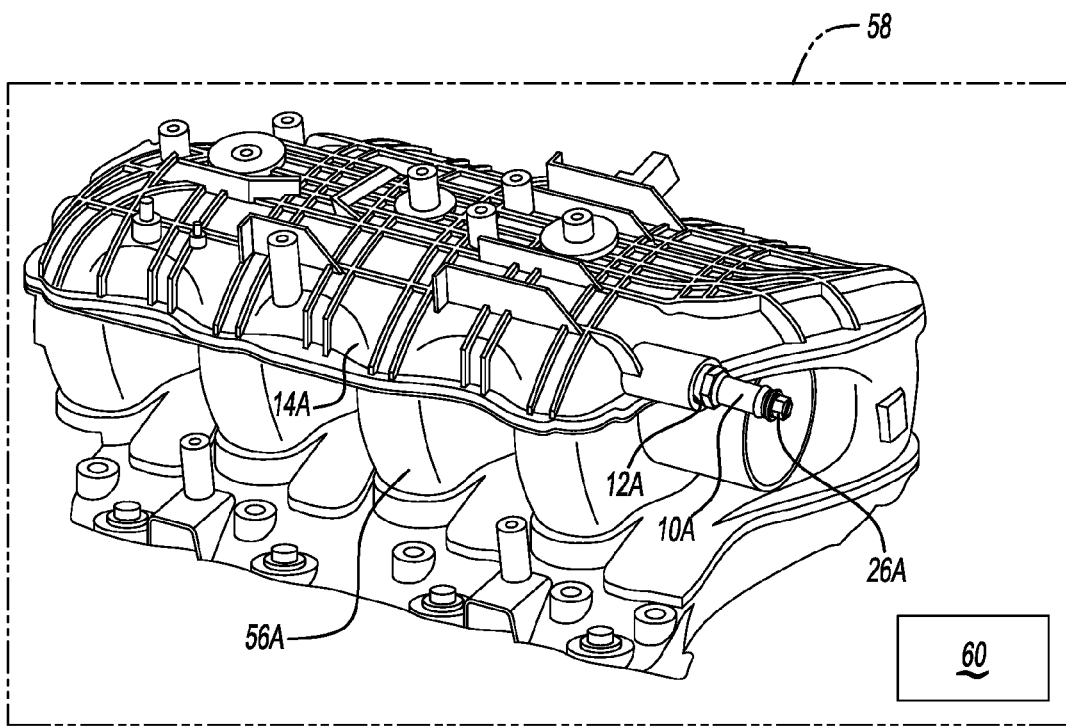
FIG. 8 is a schematic perspective view of an engine on a second vehicle with the engine fitting of FIG. 1 supported in the engine manifold and not connected to a brake system.

Alternatively, because the fitting 10 withstands normal engine operating pressures, it may be retained as-is, as a permanent plug for the opening 12, if installed on an engine in a vehicle that does not require vacuum assist with manifold vacuum for a brake system or other purpose. As shown in FIG. 8, a fitting with cap portion 26A (identical to cap portion 26) intact, referred to as fitting 10A and identical in all respects to fitting 10, is shown installed on vehicle 58 in an opening in manifold 14A of engine 56A, which is identical in all respects to engine 56 of FIG. 7. A brake system 60 on vehicle 58 is not a vacuum assist type. Accordingly, after testing of the engine 56A, the cap portion 26 is not removed.

Figure 9:
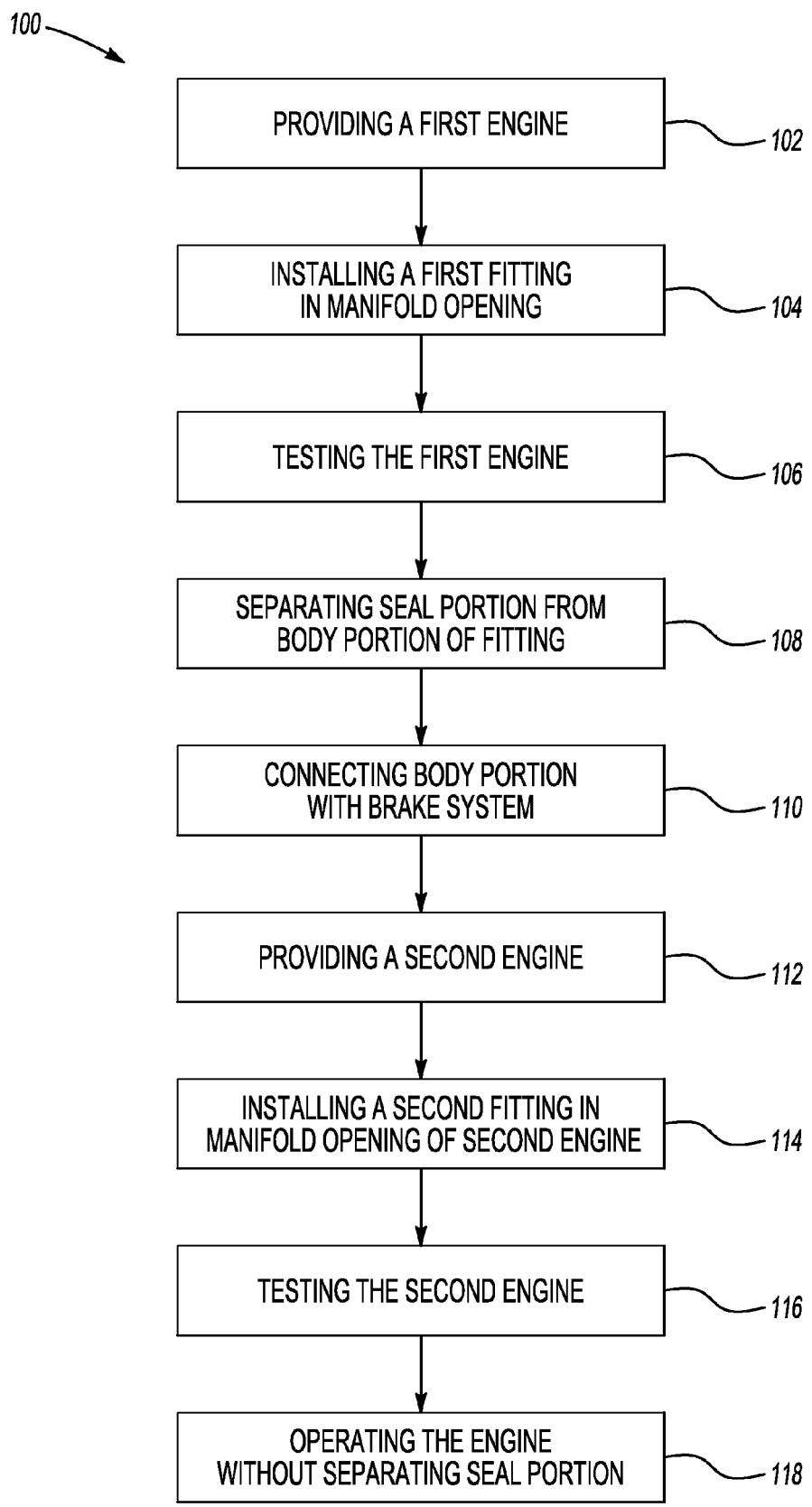
FIG. 9 is a flow diagram illustrating a method of assembling vehicles such as the vehicles of FIGS. 7 and 8.

A method 100 of assembling vehicles, illustrated in the flow diagram of FIG. 9, is discussed with respect to the fitting 10 (and identical fitting 10A) described above. The method 100 includes step 102, providing a first engine 56 with a first engine manifold 14 having a first opening 12. The method 100 further includes step 104, installing a first fitting 10 in the first opening 12. Next, the method 100 includes step 106, testing the engine 56 with the fitting 10 with seal portion 26 sealing the opening 12. After step 106 is complete, the method 100 includes step 108, separating the seal portion 26 from a body portion 18 of the fitting 10 at a weakened joint 28 by applying the predetermined torque to the seal portion 26. After step 108, step 110 may be performed, connecting the body portion 18 with a brake system 52 on the first vehicle 54 to enable vacuum assist of the brake system 52 via a vacuum within the manifold 14.

Because the fitting 10 is configured to withstand engine operating pressures without separating, the method 100 also includes step 112, providing a second engine 56A with a second engine manifold 14A having a second opening 12A. Next, step 114 is performed, installing a second fitting 10A (identical to fitting 10) in the second opening 12A. Step 116, testing the second engine 56A with the seal portion 26A of the second fitting 10A sealing the second opening 12A. After step 116, the method 100 includes step 118, operating the engine 56A on a second vehicle 58 without separating the second seal portion 26A. Thus, the same type of fitting is used for engine testing, and for in-use on both vehicles with brake vacuum assist and those without.

While the best modes for carrying out the invention have been described in detail, those familiar with the art to which this invention relates will recognize various alternative designs and embodiments for practicing the invention within the scope of the appended claims.

The invention claimed is:

1. A dual-purpose component for an engine having an air intake manifold with an opening therein comprising:
  a fitting having:
    a body portion configured to fit within the opening and defining a passage having opposing first and second ends;
    a seal portion enclosing the first end of the passage; wherein the second end of the passage is open to the manifold when the body portion is fit within the manifold;
    a thinned wall joining the body portion and the seal portion establishing a predetermined fracture region at which the seal portion will separate from the body portion when sufficient torque is applied to the seal portion to thereby open the first end of the passage, the fitting thereby functioning as a seal when the seal portion is joined with the body portion, and functioning as a conduit when the seal portion is separated from the body portion;
  wherein the seal portion has a flange extending radially-outward adjacent the thinned wall and an annular ridge opposite the thinned wall from the flange; and wherein the flange defines a radially-extending surface for supporting a tool applied to the seal portion.

2. The dual-purpose component of claim 1, wherein the seal portion has a recess therein extending from the thinned wall to localize the separation of the seal portion and the body portion at the fracture region.

3. The dual-purpose component of claim 2, wherein the passage has an outer periphery; and wherein the recess tapers into the seal portion from the outer periphery of the passage.

4. A brake vacuum fitting in combination with an engine manifold; wherein the fitting is configured to connect the engine manifold with a brake system, the engine manifold having an opening therein, comprising:

a one-piece fitting having:
   a body portion fit within the opening and defining a passage having opposing first and second ends; wherein the first end is outside of the manifold and the second end is inside of the manifold;
   a seal portion enclosing the first end of the passage; and
   wherein the fitting is characterized by a weakened joint between the body portion and the seal portion establishing a predetermined fracture region at which the seal portion will separate from the body portion when a predetermined torque is applied to the seal portion to thereby open the first end of the passage, the fitting thereby functioning as a seal when the seal portion is joined with the body portion, and functioning as a conduit for supplying a vacuum to the brake system when the seal portion is separated from the body portion.

5. The brake vacuum fitting of claim 4, wherein the passage has an outer periphery; and wherein the recess tapers into the seal portion from the outer periphery of the passage.

6. The brake vacuum fitting of claim 4, wherein the fitting is configured such that the seal portion will be retained to the body portion without fracture at a manifold pressure not greater than a predetermined range of engine operating pressures.

* * * * *